(12) United States Patent
Koga

(10) Patent No.: US 11,769,429 B2
(45) Date of Patent: Sep. 26, 2023

(54) MAGNETIC ERASING DEVICE

(71) Applicant: Zero Lab Co., Ltd., Tokyo (JP)

(72) Inventor: Ritsuo Koga, Tokyo (JP)

(73) Assignee: Zero Lab Co., Ltd., Tokyo (JP)

( * ) Notice: Subject to any disclaimer, the term of this patent is extended or adjusted under 35 U.S.C. 154(b) by 267 days.

(21) Appl. No.: 17/218,299

(22) Filed: Mar. 31, 2021

(65) Prior Publication Data

US 2021/0217332 A1 Jul. 15, 2021

Related U.S. Application Data

(63) Continuation of application No. 15/679,767, filed on Aug. 17, 2017, now Pat. No. 10,997,880.

(30) Foreign Application Priority Data

Aug. 22, 2016 (JP) ................................. 2016-161634

(51) Int. Cl.
| | | |
|---|---|---|
| *G09F 9/37* | (2006.01) | |
| *B43L 1/00* | (2006.01) | |
| *G02F 1/09* | (2006.01) | |

(52) U.S. Cl.
CPC .............. *G09F 9/375* (2013.01); *B43L 1/008* (2013.01); *G02F 1/09* (2013.01); *G02F 1/094* (2021.01)

(58) Field of Classification Search
CPC ............. G02F 1/09; G02F 1/094; G09F 9/375
USPC .................................................. 361/139–151
See application file for complete search history.

(56) References Cited

U.S. PATENT DOCUMENTS

| | | | |
|---|---|---|---|
| 4,157,581 A | | 6/1979 | Keiichi et al. |
| 4,467,389 A | | 8/1984 | Knipp |
| 4,672,345 A | | 6/1987 | Littwin et al. |
| 5,132,860 A | | 7/1992 | Von Stein |
| 5,317,340 A | | 5/1994 | Mody |
| 5,420,832 A | | 5/1995 | Shigematsu et al. |
| 5,942,744 A | * | 8/1999 | Kamo ................. G11B 21/04 235/487 |
| 5,963,029 A | * | 10/1999 | Pressesky ............. G11B 5/012 360/25 |
| 6,163,148 A | | 12/2000 | Takada et al. |
| 6,473,072 B1 | * | 10/2002 | Comiskey ......... G02F 1/16757 345/173 |
| 6,807,065 B2 | | 10/2004 | Sato |
| 7,015,892 B1 | * | 3/2006 | Nihira .................. G09F 9/375 434/409 |
| 7,164,569 B1 | | 1/2007 | Thiel et al. |
| 7,626,800 B2 | | 12/2009 | Yoon |

(Continued)

FOREIGN PATENT DOCUMENTS

| | | |
|---|---|---|
| JP | 2000276082 A | 10/2000 |
| JP | 0148548 A1 | 7/2001 |
| JP | 4089808 B2 | 5/2008 |

*Primary Examiner* — Tuan T Dinh
(74) *Attorney, Agent, or Firm* — Slater Matsil, LLP

(57) ABSTRACT

A magnetic erasing device including a magnet that includes an S pole and an N pole extending along an axial direction of the magnet, and a rotation mechanism for rotating the magnet in a housing around an axis of the magnet, wherein lines of magnetic force generated around the axis of the magnet during rotation of the magnet are designed to be applied to magnetic particles in the microcapsules to erase a visible image on a magnetic panel when the axis of the magnet is spaced from a surface of the magnetic panel by a predetermined distance.

20 Claims, 16 Drawing Sheets

(56) References Cited

U.S. PATENT DOCUMENTS

| | | | |
|---|---|---|---|
| 7,706,102 B1 | 4/2010 | Gershman et al. | |
| 7,717,038 B2 | 5/2010 | Raksha et al. | |
| 7,885,032 B1 | 2/2011 | Rahman et al. | |
| 9,095,939 B2* | 8/2015 | Mok | B23P 19/04 |
| 2003/0170457 A1 | 9/2003 | Iwasaki et al. | |
| 2007/0115602 A1 | 5/2007 | Olliges | |
| 2009/0284890 A1* | 11/2009 | Thiel | H01F 13/003 |
| | | | 361/149 |
| 2014/0133114 A1 | 5/2014 | Saji et al. | |
| 2016/0239114 A1 | 8/2016 | Sainis et al. | |

* cited by examiner

FIG. 2
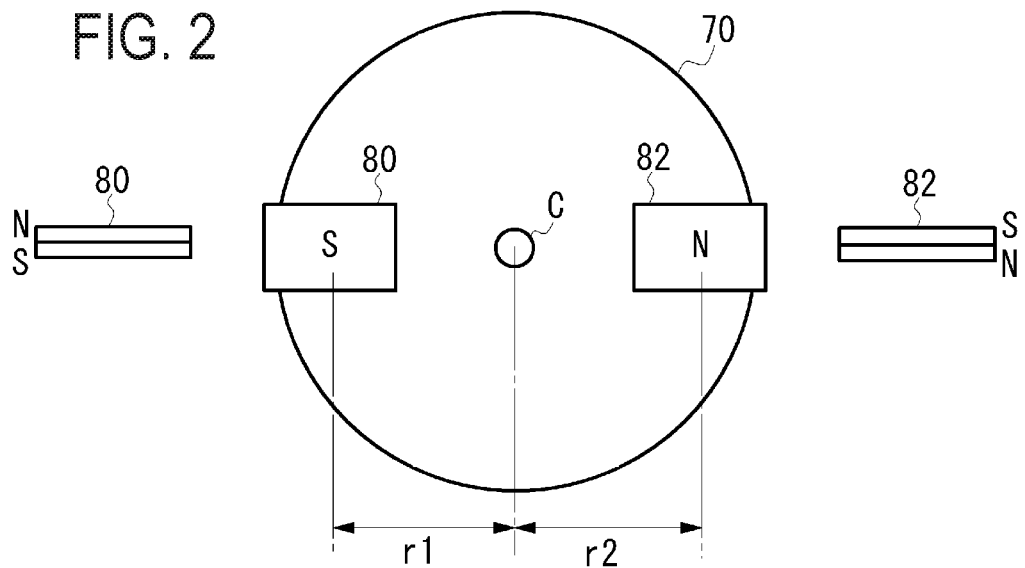
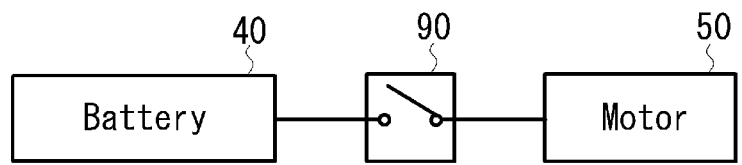
FIG. 3A
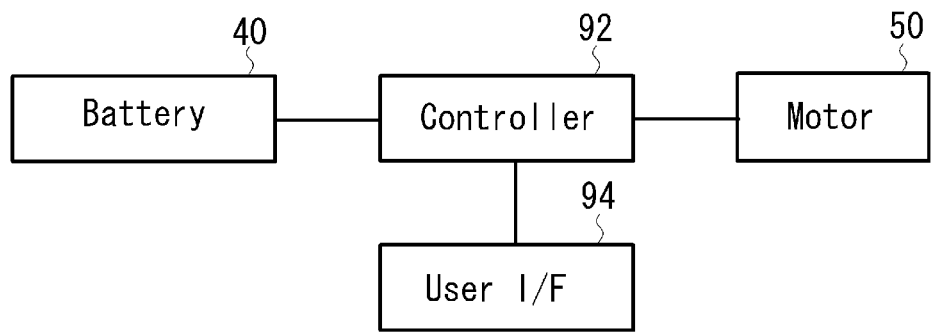
FIG. 3B

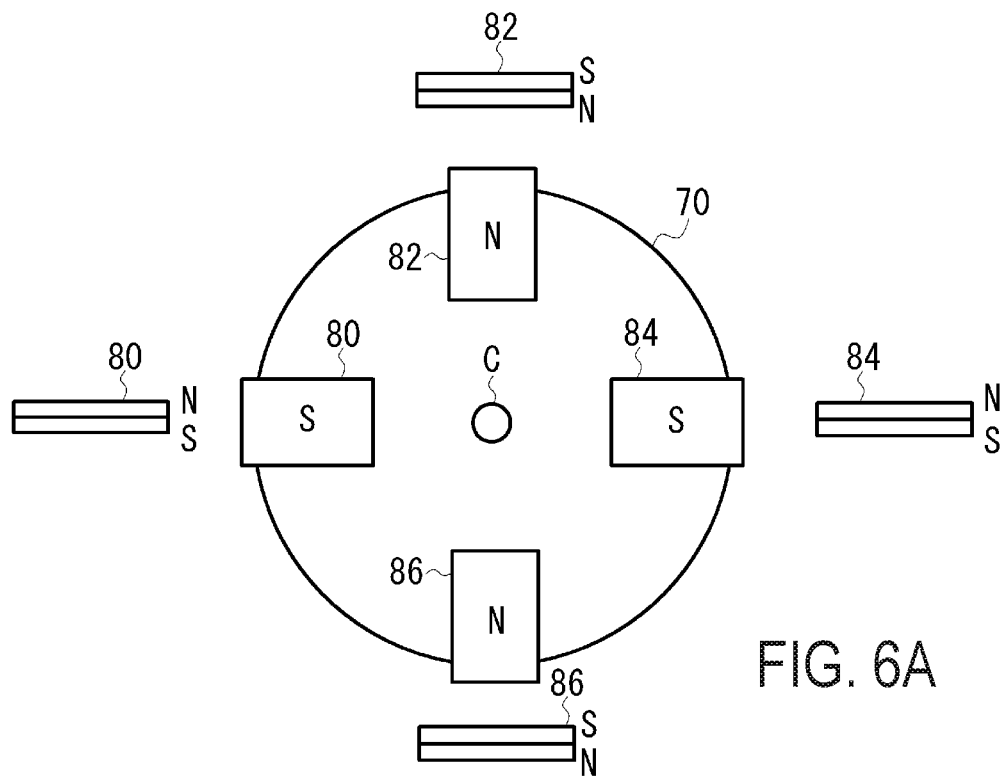
FIG. 6A
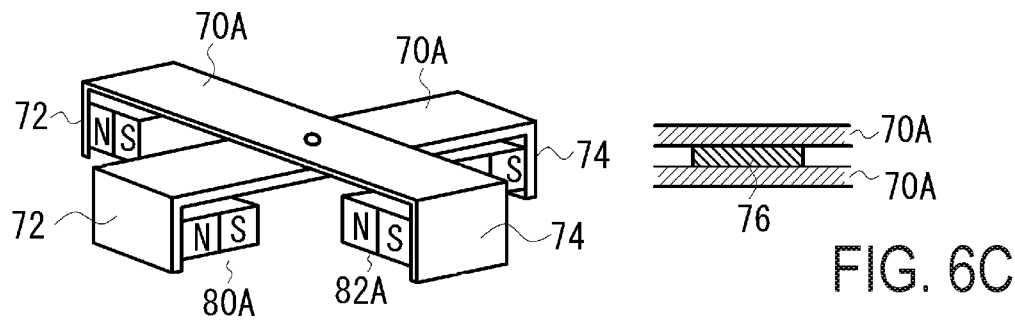
FIG. 6B
FIG. 6C
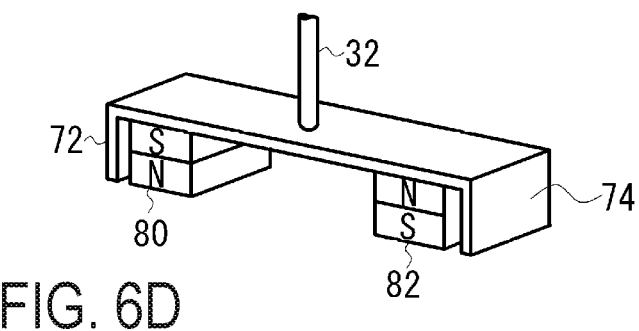
FIG. 6D

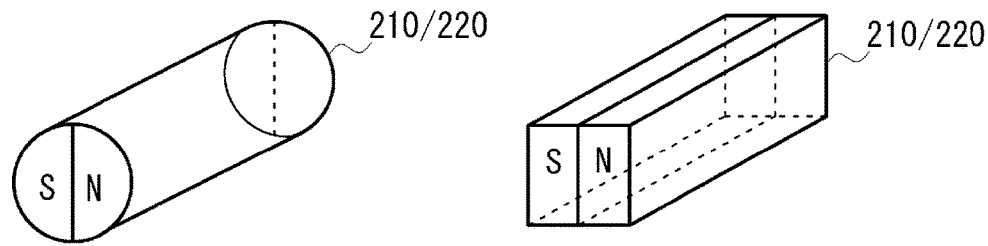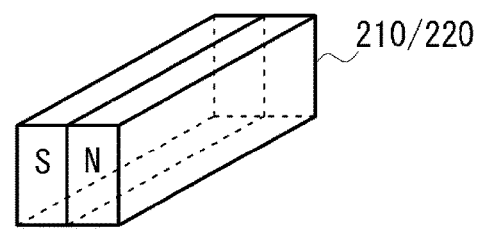
FIG. 8A  FIG. 8B
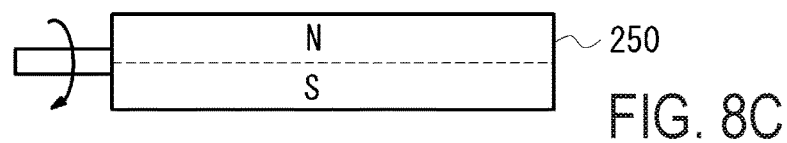
FIG. 8C
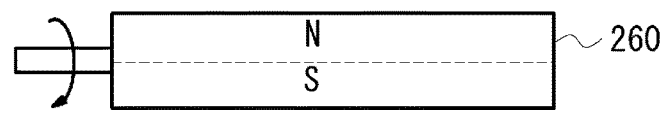
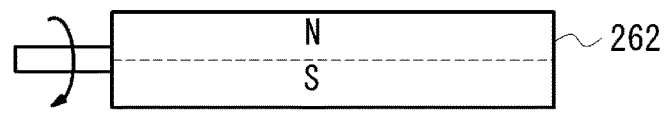
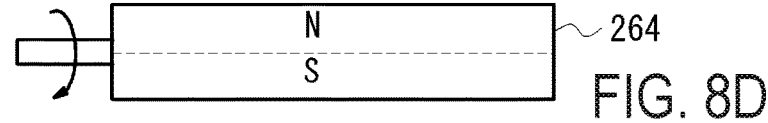
FIG. 8D
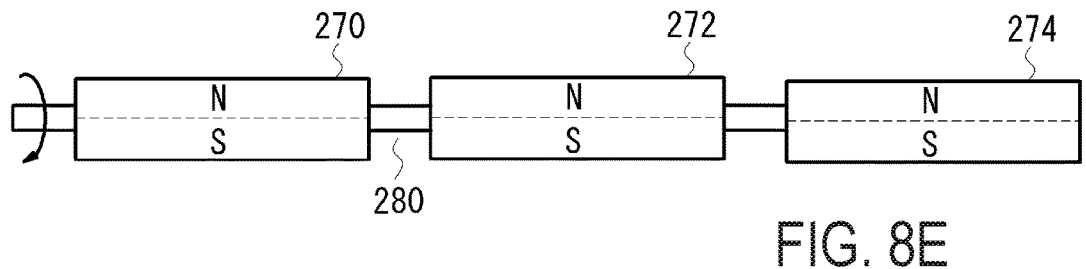
FIG. 8E

T1-T2

T2-T3

T3-T4

T4-T5

T5-T6

T6-T7

T7-T8

T8-T9

MAGNETIC ERASING DEVICE

CROSS-REFERENCE TO RELATED APPLICATIONS

This application is a continuation of U.S. application Ser. No. 15/679,767, filed on Aug. 17, 2017, which claims priority to Japanese Application No. 2016-161634, filed on Aug. 22, 2016, which application is hereby incorporated herein by reference.

TECHNICAL FIELD

The present invention relates to a magnetic erasing device.

BACKGROUND

A magnetophoretic type magnetic panel has been come into practical use. Such a magnetic panel includes magnetic particles and a dispersion liquid in each microcapsule. The magnetic particles in the microcapsules are migrated to draw desired letters, symbols, pictures, etc. by a magnetic field applied from a magnetic pen having a magnet at the tip thereof. A magnetically reversal type magnetic panel in which each magnetic display body has an N pole and an S pole at front and back sides and which each pole is colored with different colors has also been put to practical use.

Characters, symbols and the like drawn on the magnetic panel can be erased by using an erasing tool with magnetization (hereinafter may be referred to as a magnetic erasing device) to the front side or the back side of the magnetic panel. For example, a recording apparatus in Japanese patent publication No. 2000-276082 includes a magnetic sheet having microcapsules for recording and an erasing sheet provided on the back side of the magnetic sheet, and characters and figures on the magnetic sheet are erased by reciprocating while maintaining the erasing sheet substantially parallel to the magnetic sheet by utilizing the motive power of the motor. International patent publication No. WO 01/048548 discloses a magnetic directing device for a magnetic-body-reversal-display-panel which enables to erase letters, graphics, etc. by applying a magnetic force in an adverse direction opposite to the magnetic force applied during recording, from the writing surface. Japanese patent registration No 4089808 discloses a magnetophoretic display sheet including two or more types of magnetic particles in each microcapsule, which is erasable from an upper side.

As shown in WO 01/048548, an erasing device used in a conventional magnetic panel utilizes lines of magnetic force generated from magnets fixed in a housing, as the results, characters, figures, etc. in areas that the lines of magnetic force in a certain direction are applied are deleted, but not deleted in other areas. Therefore, in order to evenly erase letters, figures, etc. drawn on the magnetic panel, the user needs to move the erasing device in all directions on the magnetic panel to apply magnetic field from various angles, which is troublesome in operation, this is the problem. Also, in the type of driving the erasing sheet on the back side of the magnetic sheet as in No. 2000-276082, it is not possible to erase characters from the front side of the magnetic panel (the surface written by the magnetic pen), which is not convenient, it is the problem.

SUMMARY

Embodiments of the present invention relate to a magnetic erasing device for erasing letters, figures, symbols, etc. drawn on a magnetic panel including magnetized display bodies, and particular embodiments relate to a magnetic erasing device with an improved erasing efficiency by changing the direction of a magnetic field applied to the magnetic panel.

Embodiments of the present invention solve conventional problems, and provide a magnetic erasing device for easily erasing characters etc. drawn on a magnetic panel.

In the present invention, a magnetic erasing device for a magnetic panel comprises a housing, an internal space being formed in the housing. A magnetic field generator is accommodated in the housing and generates a magnetic field. A magnetic field changer changes the magnetic field generated by the magnetic field generator.

In some embodiments, the magnetic field generator includes at least one permanent magnet and the magnetic field changer includes a rotating mechanism for rotating the permanent magnet.

In some embodiments, the magnetic field generator includes a rotating member provided in the housing and at least first and second magnets attached to the rotating member, an S pole of the first magnet arranged at a front side and an N pole of the second magnet arranged at a front side, and the magnetic field changer changes the magnetic field by rotating the rotating member.

In some embodiments, the magnetic field generator includes a rotating member provided in the housing and at least first and second magnets attached to opposite positions of the rotating member, an S pole and an N pole formed on the surface of the first magnet, and an S pole and N pole formed on the surface of the second magnet, and the lines of magnetic force from the N pole to the S pole between the first and the second magnets are formed.

In some embodiments, the first and second magnets are disposed in a rotationally symmetrical.

In some embodiments, the magnetic field generator includes at least first and second magnets so that an S pole and an N pole are formed along the axial direction respectively and the magnetic field changer rotates the first and second magnets about their axes.

In some embodiments, the magnetic field changer rotates the first and the second magnets so that the S pole and the N pole are synchronized with each other.

In some embodiments, the magnetic field changer includes a rotating mechanism for rotating the first and second magnets by first and second gears, a gap between the first and second magnets adjusted by the first and second gears.

In some embodiments, the magnetic field generator includes an annular magnetic member having a plurality of protrusions formed at the inner periphery, a plurality of coils wound around the plurality of protrusions, and current applying means for applying a current to the plurality of coils, and the magnetic field changer controls a timing of application of current by the current applying means.

In some embodiments, the plurality of protrusions are arranged at equal intervals and the magnetic field changer controls the timing of application of current such that a pair of opposing protrusions successively generate an S pole and an N pole.

In some embodiments, the magnetic field generator includes a columnar iron core and a coil wound around the iron core, and the magnetic field changer applies an AC waveform current to the coil.

In some embodiments, the magnetic field generator is disposed at a position recessed from an end of the housing by a predetermined distance.

In some embodiments, the magnetic erasing device further comprises an input switch for activating the magnetic field changer.

In some embodiments, the magnetic erasing device further comprised a sensor for operating the magnetic field changer.

In some embodiments, the magnetic erasing device further comprises a variable mechanism for varying the distance of the magnetic field generator from the end of housing.

In some embodiments, the magnetic erasing device further comprises input means for receiving a instruction from a user, the magnetic field generator adjusts the variable mechanism in response to the input from the user.

In some embodiments, the magnetic erasing device further comprises a cover member covering an open end of the housing, the surface of the cover member is provided with a material for facilitating sliding.

In some embodiments, the magnetic field changer includes a motor and a battery as a power source.

In some embodiments, the housing is made of a magnetic material.

According to embodiments of the present invention, since the magnetic field generated in the housing is changed, it is possible to obtain the same effect as the action of lines of magnetic force in various directions on the magnetic panel, thereby characters etc. drawn on the magnetic panel being erased more efficiently. This improves the user's convenience.

BRIEF DESCRIPTION OF THE DRAWINGS

FIG. 1, which includes FIG. 1A is a top view of the magnetic erasing device and FIG. 1B is a sectional view of A-A line of the magnetic erasing device.

FIG. 2 is a plane view of a support attached to a magnet.

FIG. 3A and FIG. 3B show a block diagram showing an electrical configuration example of the magnetic erasing device of the present embodiment.

FIG. 6, which includes FIGS. 6A-6D, shows a modified example of the magnetic erasing device according to the first embodiment of the present invention.

FIGS. 8A and 8B show an example of a rod-shaped permanent magnet applicable to the second embodiment.

FIGS. 8C-8E explain a modification of the second embodiment.

FIG. 10, which includes

FIG. 12, which includes

FIG. 13, which includes

Figure 1A:
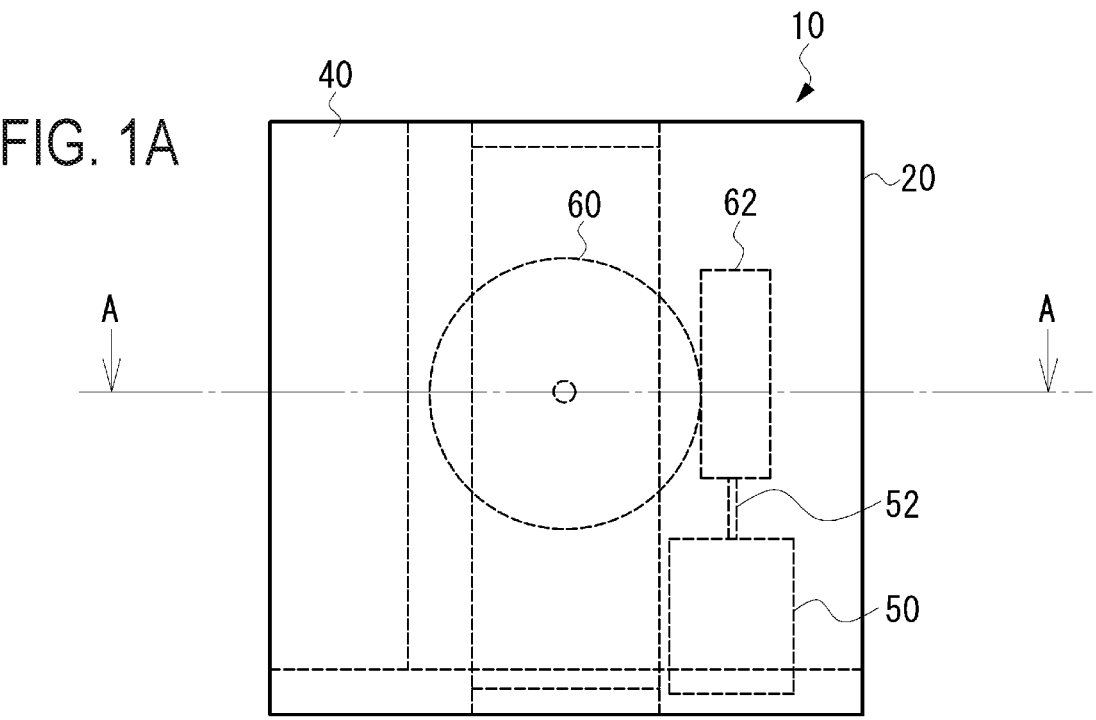
FIGS. 1A and 1B, shows a magnetic erasing device according to a first embodiment of the present invention.

The following reference numerals can be used in conjunction with the drawings:

10, 10 A, 10 B: magnetic erasing device
20: housing
22: internal space
24: open end
30: support
40: battery
50: motor
60, 62: gear
70: rotor
80: magnet
100: magnetic panel
110: top sheet
120: back sheet
130: microcapsule
200: support
210, 220: permanent magnet
230, 232, 234: gear
300, 302: stator
310: protrusion
320: coil
400, 410, 420: iron core
430: coil

DETAILED DESCRIPTION OF ILLUSTRATIVE EMBODIMENTS

Next, embodiments of the present invention will be described in detail with reference to the drawings. In a preferred embodiment of the present invention, a magnetic erasing device has a mechanism for dynamically changing a magnetic field for enabling to erase characters, figures, symbols etc. drawn by a magnetic pen on a magnetic panel by applying the changing magnetic field to the magnetic panel. Please note that the size of each part shown in the drawing is not necessarily the same as the size of the actual product.

Figure 1B:
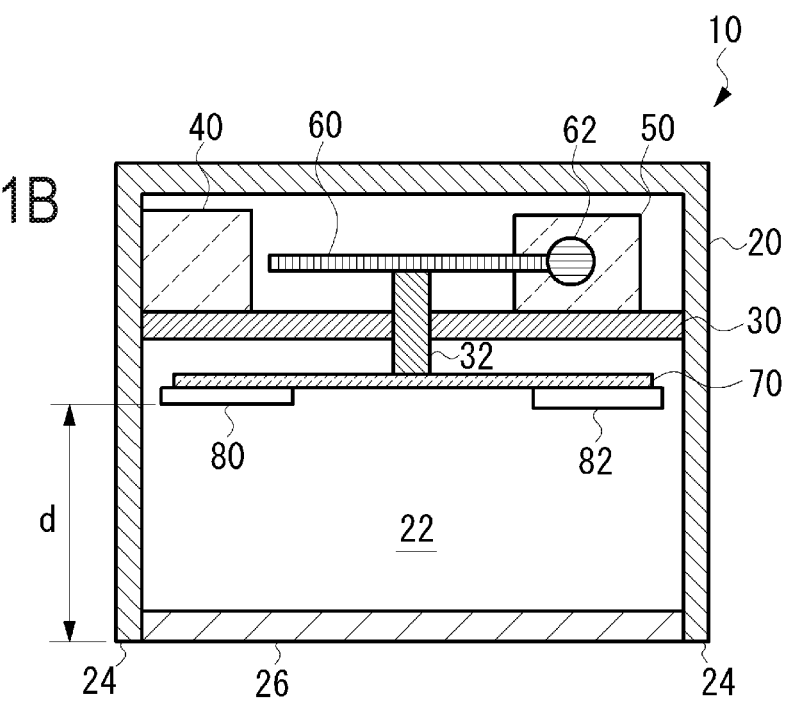

FIG. 1 shows a magnetic erasing device according to a first embodiment of the present invention, FIG. 1A is a top view of the magnetic erasing device, FIG. 1B is a cross-sectional view of A-A line of the magnetic erasing device. The magnetic erasing device 10 of the present embodiment includes a cylindrical housing 20 in which a space 22 is formed. The housing 20 may be made of various materials such as metal and resin, but is preferably made of a magnetic material such as iron. In the internal space 22 of the housing 20, a disk-shaped support 30 is attached. The material of the support 30 is arbitrary, but it is composed of, for example, a metal. For example, the side surface of the support 30 is fixed to the inner wall of the housing 20 with a resin or the like, and the internal space 22 is divided into upper and lower spaces by the support 30.

A battery 40, a motor 50, and a gear 60 are accommodated in the upper internal space. The battery 40 is disposed at one end of the support 30, and the motor 50 is disposed at the other end. The battery 40 is a power source for driving the motor 50. The battery 40 and the motor 50 are electrically connected to circuit components/wirings (not shown) mounted on the support 30. Further, a shaft 32 is rotatably attached to substantially the center of the support 30. A spur gear 60 is attached to one end of the shaft 32, and a rotating member 70 is attached to the other end of the shaft 32. A worm gear 62 is connected to the drive shaft 52 of the motor 50, and the worm gear 62 meshes with the spur gear 60. Therefore, when the drive shaft 52 of the motor 50 rotates, its rotation is transmitted to the shaft 32 via the worm gear 62 and the spur gear 60 for rotating the rotating member 70.

In the lower internal space, the circular rotating member 70 and a plurality of magnets 80, 82 are accommodated. The rotating member 70 is made of an arbitrary material, but is preferably made of a magnetic material such as iron. The rotating member 70 is connected to the shaft 32 as described above and is rotatable by the motor 50. The first and second magnets 80, 82 are mounted on one surface of the rotating member 70. FIG. 2 shows a plane view of a rotating member 70 to which the magnets 80, 82 are attached. The first and second magnets 80, 82 may be the same shape. The first and second magnets 80, 82 are attached to the rotating member 70 so that their poles are opposite to each other. In the example of drawing, each magnet 80, 82 has the same rectangular shape, and each magnet is disposed at a position at a radius r 1, r 2 from the axial center C of the rotating member 70. Preferably, r 1=r 2, and the first and second magnets 80, 82 are arranged rotationally symmetrically. Further, the N pole of the first magnet 80 faces the rotating member 70 to expose the S pole, and conversely the S pole of the second magnet 82 faces the rotating member 70 to expose the N pole.

The rotating member 70 or the first and second magnets 80, 82 are adjusted to be recessed from an open end 24 of the housing 20 by a distance d, as shown in FIG. 1B. A cover 26 for shielding the internal space 22 is attached to the open end 24 of the housing 20. The cover 26 is made of a nonmagnetic material, for example resin or plastic, for transmitting the magnetic field generated by the magnets 80, 82.

FIG. 3A and FIG. 3B are a diagram showing an exemplified electrical configuration of the magnetic erasing device of the present embodiment. FIG. 3A shows the simple configuration. The magnetic erasing device 10 includes, for example, a switch 90 on the top surface of the housing 20. The user operates on/off of the switch 90 to drive or stop the motor 50.

FIG. 3B includes a controller 92 for controlling the driving of the motor 50 and an user interface I/F 94 for receiving inputs from the user. The controller 92 activates the motor 50 or adjusts the rotational speed of the motor 50 according to the instruction from the user. In addition, the controller 92 may perform a timer function of automatically turning off the driving of the motor 50 after a certain period of time from the start up of the motor 50.

Figure 3C:
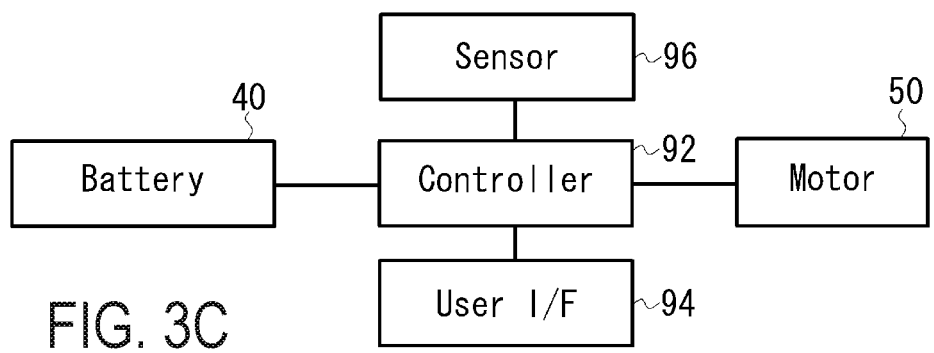
FIG. 3C and FIG. 3D show a block diagram showing another electrical configuration example of the magnetic erasing device of the present embodiment.
Figure 3D:
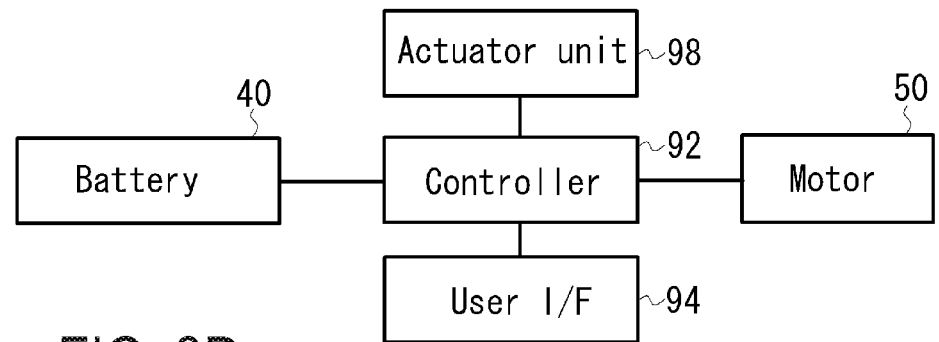

FIG. 3C and FIG. 3D is a block diagram showing another electrical configuration. This configuration includes a sensor 96. The sensor 96 may be mounted on either surface of the housing 20, for example. The sensor 96 may be a contact sensor for detecting any object (including user contact) that has been touched on the housing 20. The controller 92 activates the motor 50 in response to the detection of contact by the contact sensor 96 and stops the motor 50 when the contact is no longer detected. In another preferable example, the sensor 96 may be a sensor that included a light emitting element and a light receiving element such as an optical mouse. In this case, the sensor detects, for example, that the magnetic erasing device has moved over the magnetic panel and the controller 92 controls on/off of the motor 50 in response to this detection.

As shown in FIG. 1, the magnets 80, 82 are located at the distance d from the open end 24 of the housing 20. The magnetic erasing device 10 can have a variable mechanism for varying the distance d. The variable mechanism can be configured using known techniques. For example, the variable mechanism includes a screw mechanism, which changes the vertical height of the rotating member 70 or the magnets 80, 82 by rotating the screws. In this case, an operation member for rotating the screw may be provided so that the user can operate it from the outside of the holder 20. Alternatively, the variable mechanism may include a sliding mechanism to adjust the height of the rotating member 70 or the magnets 80, 82 by sliding the sliding member in the vertical direction.

Further, the variable mechanism may be electrically operated by an actuator. FIG. 3D shows a block diagram for operating the variable mechanism electrically. As shown in this figure, the actuator unit 98 includes another motor, a driving member, or the like for driving the variable mechanism. The controller 92 operates the variable mechanism by the actuator unit 98 to adjust the distance d of the magnets 80, 82, in accordance with an instruction from the user.

Figure 4A:
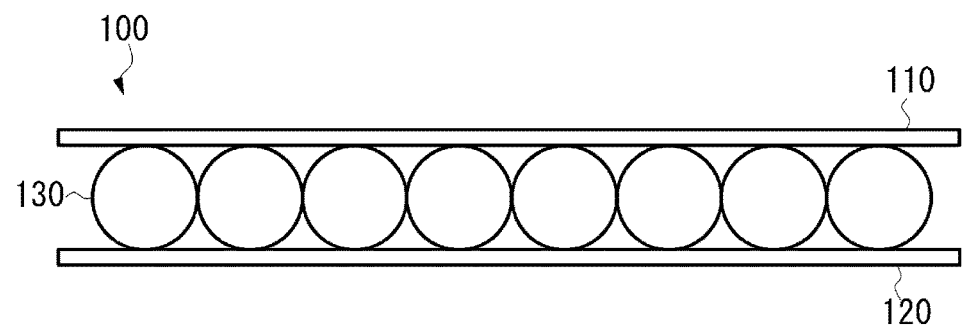
FIG. 4A is a sectional view showing an exemplified configuration of a magnetic panel.

FIG. 4A shows an example of a magnetic panel that the magnetic pen of this embodiment can be used. The magnetic panel 100 includes a top sheet 110, which is a transparent sheet capable of transmitting a magnetic field, for providing the display surface of the magnetic panel, a back sheet 120 opposite the top sheet 110, and a plurality of microcapsules 130 two-dimensionally arranged in the space between the top sheet 110 and the back sheet 120. The plurality of microcapsules 130 are accommodated in a case (not shown).

Preferably, the microcapsule 130, for example, includes at least one kind of magnetic particles having a particle size of 0.1 μm to 1.0 μm, at least one kind of magnetic particles having a particle size of 1 μm to 20 μm, white nonmagnetic particles such as white titanium oxide, dispersion and additives in a transparent spherical cell. The size of the microcapsules is, for example, 50 to 650 μm. Such a magnetophoretic type magnetic panel is disclosed in, for example, Japanese patent No. 4089808, which is incorporated by reference herein, and has the following features.

Small particles are easily reacted in the direction of lines of magnetic force with horizontal lines of magnetic force.

In the magnetic pen having the vertical lines of magnetic force, the large and small magnetic particles are reacted to allow the front side to change black for drawing characters.

When erasing from the front side of the magnetic panel, if only the horizontal magnetic field lines are applied to the small particles sensitive to the horizontal lines of magnetic force, the small particles migrate in the direction of the lines of magnetic force to change white. At this time, since the large particles rarely react, they remain "black", and the black can be seen through from the front side, so that it does not completely become white, which generates decrease in contrast.

In order to erase characters, it is sufficient to react horizontal lines of magnetic force. On the contrary, a magnetic pen having horizontal lines of magnetic force erase the written characters by itself immediately, which causing defects.

Figure 4B:
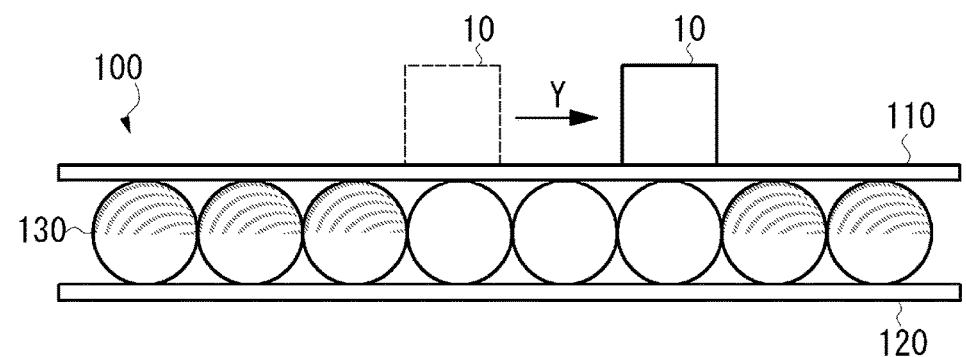
FIG. 4B shows an example of erasure by a magnetic erasing device.

One microcapsule 130 forms one pixel. For example, as shown in FIG. 4B, when the magnetic field is applied to the microcapsule 130 by the magnetic pen 10 on the top sheet 110, as described above, in response to the lines of magnetic force in the vertical direction from the magnetic pen, the black magnetic particles in the microcapsules 130 migrate to the front surface. In this manner, when the magnetic pen 10 is moved on the top sheet 110, the magnetic particles in the microcapsules 130 migrate in accordance with the movement to form images. On the other hand, when erasing the images, an erasing magnet (not shown) is slid on the top sheet 110, and small particles migrate to the front side in response to the lines of magnetic force in the horizontal direction from the erasing magnet to erase the images. In this case, it is desirable that a certain clearance is provided between the erasing magnet and the top sheet 110 so as to apply a large amount of horizontal lines of magnetic force to the magnetic panel.

Note that the microcapsule 130 is not necessarily limited to the above structure. For example, the microcapsule 130 may include permanent magnet particles in a transparent spherical cells and the permanent magnet particle may be magnetized so as to have N pole and S pole. The magnetic panel may be erased from the front side or back side. For example, the permanent magnet particles of N pole may be painted black, and the permanent magnet particles of S pole may be painted white, and the permanent magnet particles can move freely within the cell according to the magnetic field from the magnetic pen or erasing magnet.

In addition to the magnetophoresis type, the magnetic panel may be a magnetic reversal type magnetic sheet. Further, the magnetic panel 100 may erase the drawn images by applying the magnetic field from the top sheet 110 or may erase the drawn images by applying the magnetic field from the back sheet 120.

Figure 5A:
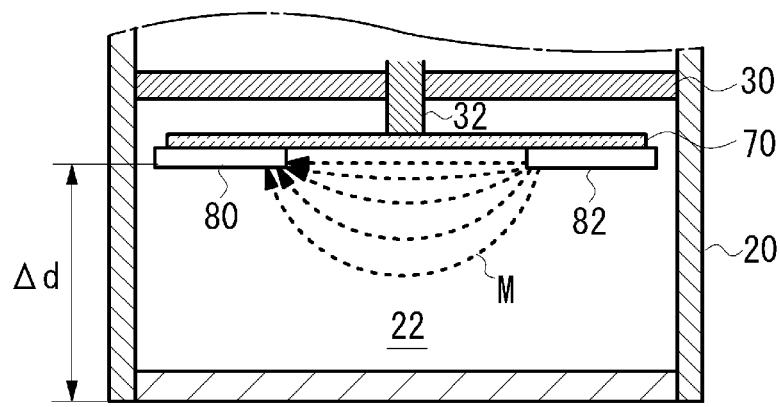
FIG. 5A is a sectional view for schematically illustrating the generation of a magnetic field in the magnetic erasing device of the first embodiment.
Figure 5B:
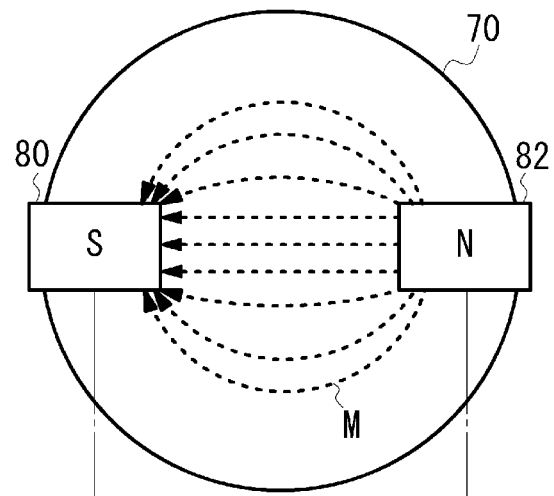
FIG. 5B is a plane view for schematically illustrating generation of a magnetic field as viewed from the bottom of the housing.
Figure 5C:
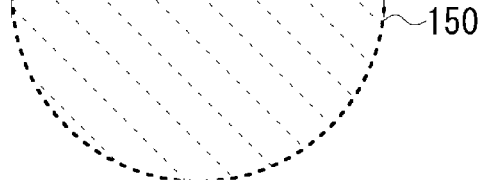
FIG. 5C is a view for explaining an erasing range.

Next, the operation of the magnetic erasing device of this embodiment will be described. FIGS. 5A and 5B are diagrams schematically showing lines of magnetic force of the magnetic erasing device 10. When the rotating member 70 or the first and second magnets 80, 82 are stationary, the lines of magnetic force M are generated from the N pole toward the S pole in the internal space 22 of the housing 20. Here, when the rotating member 70 is rotated, the direction of the lines of magnetic force M changes since the first and second magnets 80, 82 are rotated. At this time, the erasable area 150 is substantially equal to the range (r 1+r 2) in which the first and second magnets 80, 82 rotate.

FIG. 4B is a schematic view for showing the erasure by the magnetic erasing device on the top sheet 110 of the magnetic panel 100. When the magnetic erasing device 10 is moved in the Y direction on the surface side for recording, characters and the like are erased within the area. Since the first and second magnets 80, 82 are located at a distance d from the open end 24 of the housing 20, the horizontal component of the lines of magnetic force M directed from the N pole to the S pole is facilitated to act on the magnetic panel 100. If d=0, since the vertical direction of the lines of magnetic force M act on the magnetic panel 100, it is difficult for the erasure to be clear due to the influence of the vertical component. Further, the component in the horizontal direction of the lines of magnetic force M can be increased by establishing the interval (r 1+r 2) between the first magnet 80 and the second magnet 82 to an appropriate value.

Figure 5D:
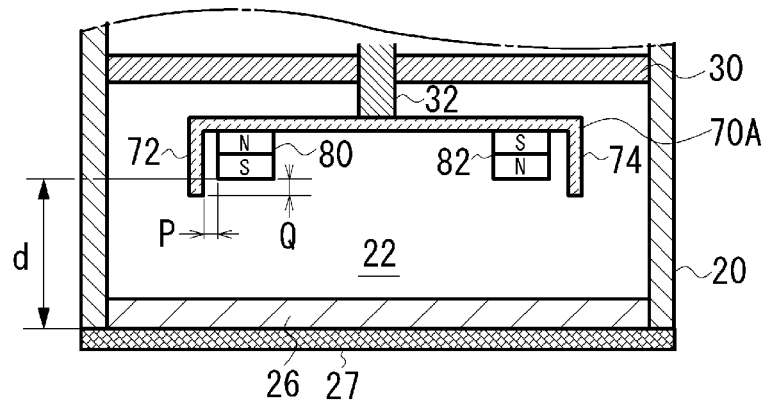
FIGS. 5D-5E show a modification of the first embodiment of the present invention.
Figure 5E:
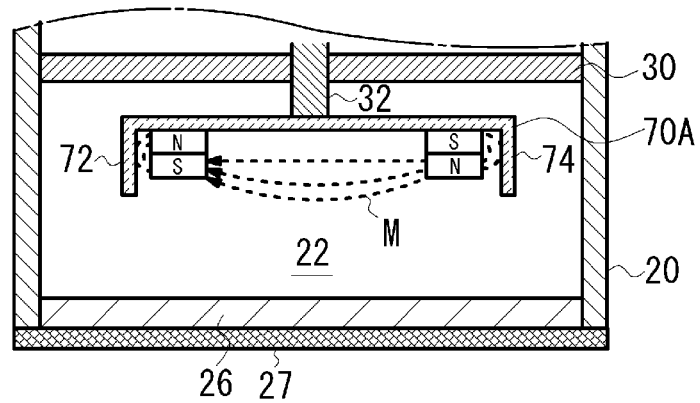

Next, a modified example of the first embodiment will be described. In FIGS. 5D and 5E, the rotating member 70A of the modified example has a rectangular shape, and its central portion is rotatably attached to the support 30 through the shaft 32. An extending portion 72 extending in the vertical direction is formed at one end portion of the rotating member 70A and an extending portion 74 is also formed on the other end portion similarly. Preferably, the rotating member 70A is made of a magnetic material, and the housing 20 is also made of a magnetic material. The magnet 80 is attached to one end portion of the rotating member 70A and the magnet 82 is attached to the other end portion of it. In a preferred embodiment, the extending portions 72, 74 are located at a height Q higher than the surface of the magnets 80, 82 to prevent the leakage of lines of magnetic force from the magnets 80, 82 to the outside of the rotating member 70A. In a further preferred example, a gap P is formed between the magnets 80, 82 and the extending portions 72, 74 respectively to shield the lines of magnetic force of the magnets 80, 82 by the extending portions 72, 74. In the present embodiment, P may be zero, that is, the magnets 80, 82 may be brought into close contact with the extending portions 72, 74, or Q may be set to zero so that the heights of the extending portions 72, 74 and the magnets 80, 82 may be equal to each other.

Further, the opening of the housing 20 is covered with a cover 26. A sliding facilitation member 27 with a soft material and a low friction (for example, a non-magnetic material such as felt) is provided on the surface of the cover 26. When sliding the magnetic erasing device 10 on the top sheet 110 of the magnetic panel 100 as shown in FIG. 4B, the sliding of the magnetic erasing device is facilitated by the sliding facilitation member 27 and scratches on the top sheet 110 are prevented. In addition to magnetic drawing, when drawing with a whiteboard marker or the like is performed on the top sheet 110, the drawing by the whiteboard marker can be erased by the sliding facilitation member 27.

FIG. 5E shows an appearance of lines of magnetic force M of the magnets 80, 82. The lines of magnetic force M is generated from the N pole to the S pole as shown. Since the gap P between the magnet 80 and the extending portion 72 and the gap P between the magnet 82 and the extending portion 74 exist, the lines of magnetic force from the N pole are effectively absorbed by the extending portions 72 and 74 so that the lines of magnetic force can be accurately confined within the radius range of the rotating member 70A.

Figure 5F:
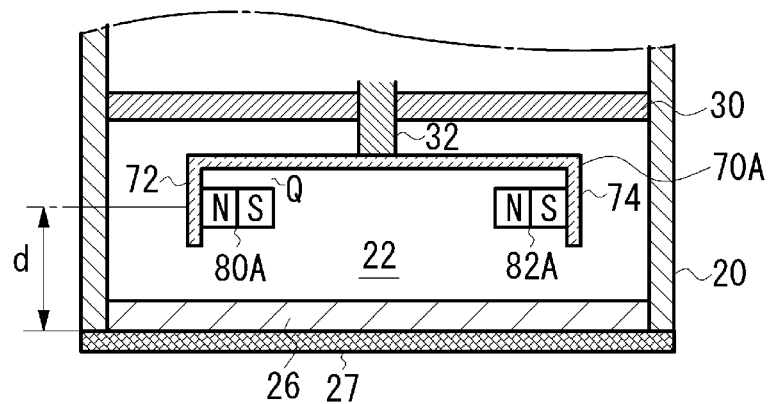
FIGS. 5F-5I show a modification of the first embodiment of the present invention.
Figure 5G:
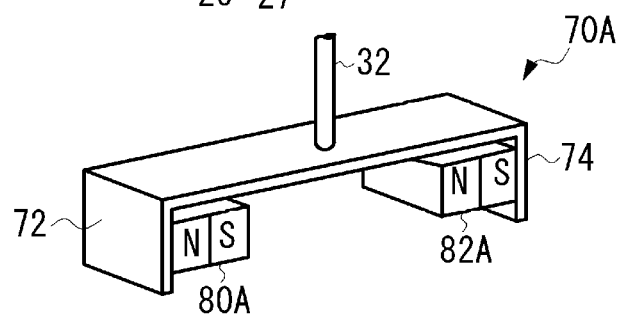

FIGS. 5F and 5G are further modified examples of the first embodiment. In this modified example, the orientations of the magnetic poles of the magnets 80A and 82A are different from those of the magnets 80 and 82. The magnet 80A is attached to one end portion of the rotating member 70A and the magnet 82A is attached to the other end portion of it. The S poles and the N poles of the magnets 80A and 82A are arranged in the radius direction of the rotating member 70A, the S pole of the magnet 80A is opposed to the N pole of the magnet 82A. Alternatively, the N pole of the magnet 80A may be arranged to face the S pole of the magnet 82A. For example, the N pole of the magnet 80A is attached to the side surface of the extending portion 72 and the S pole of the magnet 82A is attached to the side surface of the extending portion 74. The magnets 80A, 82A are separated from the upper surface of the rotating member 70A by a clearance Q. The height of the extending portions 72, 74 is higher than the magnets 80A, 82A, similarly the above modified example. FIG. 5I shows the appearance of the lines of magnetic force at this time. With such the configuration, since the lines of magnetic force generated from the magnets 80A, 82A are shielded by the extending portions 72, 74, the erasing range by the magnetic erasing device is accurately defined to the radius r1 of the magnet 80A and the radius r2 of the magnet 80B. In this example, Q may be zero so that the magnets 80A, 82A are brought into close contact with the upper surface of the rotating member 70A, or the heights of the extending portions 72, 74 and the magnets 80A, 82A may be equal.

Figure 5H:
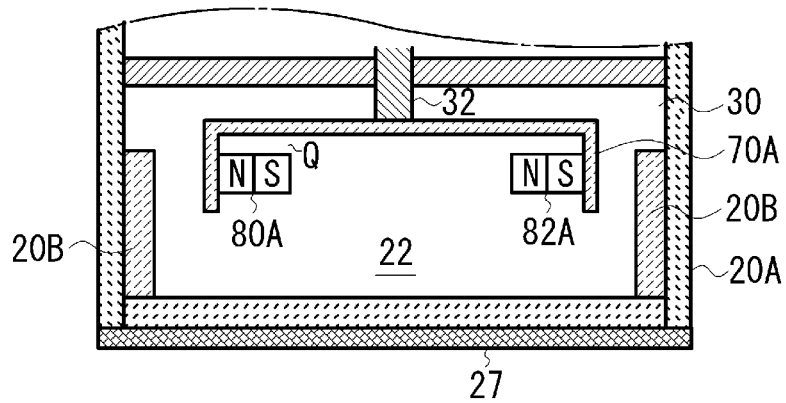
Figure 5I:
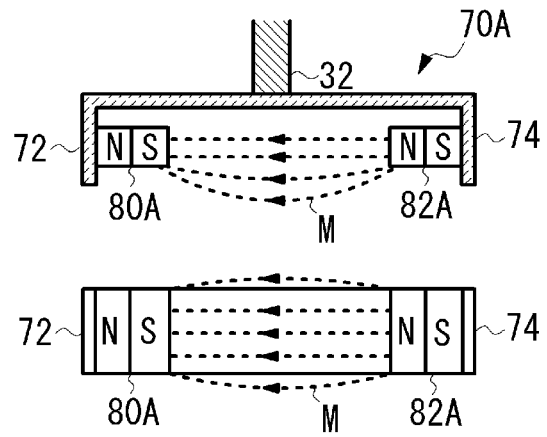

FIG. 5H is a further modified example. In this example, the housing 20A and the cover 26 are made of a non-magnetic material such as a plastic. In this case, the magnetic member 20B may be provided on the inner periphery of the housing 20A to prevent the lines of magnetic force from leaking from the housing 20A.

In the above embodiment, the two magnets 80, 82 are attached to the rotating member 70, however the number of magnets is not limited to it and more magnets may be attached. For example, as shown in FIG. 6A, four magnets 80, 82, 84 and 86 may be attached to the surface of the rotating member 70 at intervals of 90 degrees. Preferably the four magnets are arranged so that their magnetic poles are alternately reversed.

Furthermore, as shown in FIG. 6B, the four magnets may be provided with a pair of rotating members 70A so as to be orthogonal. In this case, it is desirable to provide a spacer 76 made of a non-magnetic material for blocking the magnetic coupling between the two rotating members 70A, 70A. Still another modification is shown in FIG. 6D, magnets 80, 82 with stacked an S pole and an N pole may be attached on both end portions of the rotating member 70A.

Figure 7A:
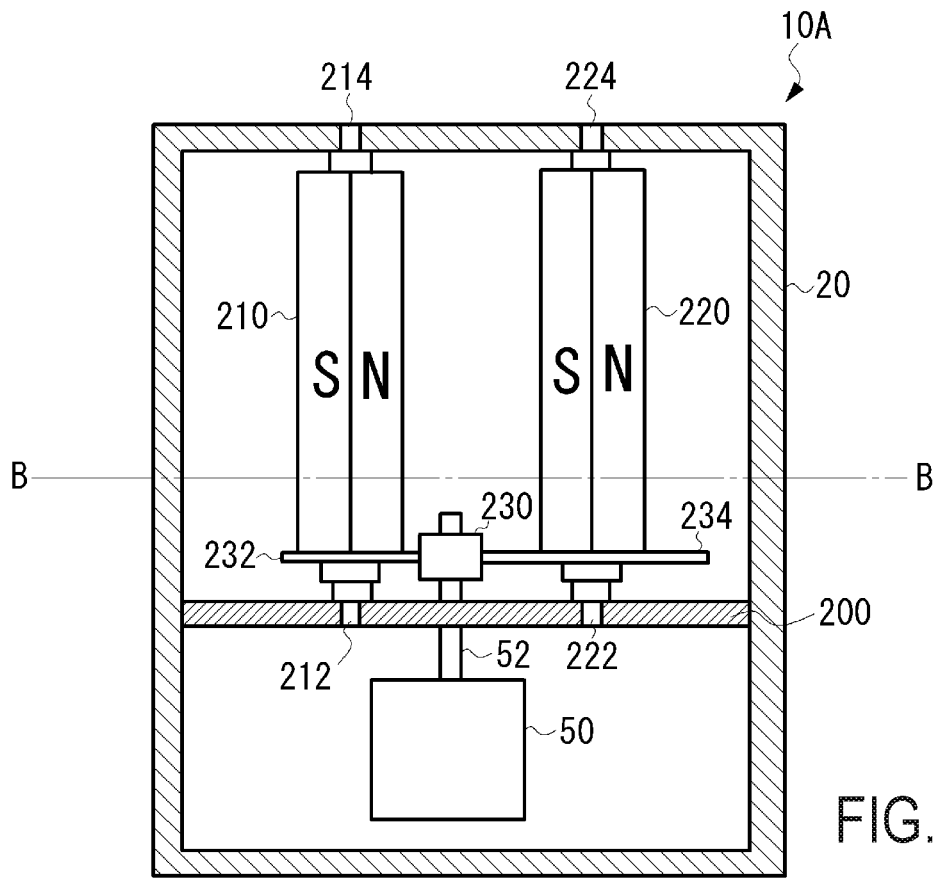
FIG. 7A is a plane view of an inside of the housing taken the upper side of the magnetic erasing device according to the second embodiment.
Figure 7B:
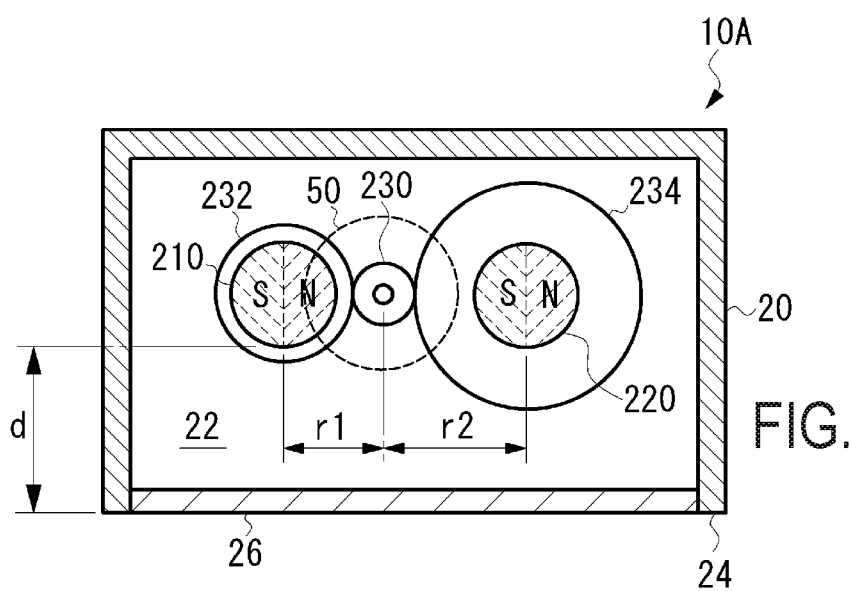
FIG. 7B is a sectional view of B-B line of FIG. 7A.

Next, a magnetic erasing device according to a second embodiment of the present invention will be described. FIG. 7A is a plane view of the interior of the housing of the magnetic erasing device with the upper part cut away, and FIG. 7B is a sectional view taken along the line B-B. The magnetic erasing device 10A according to the second embodiment includes a support plate 200 that separates the internal space of the housing 20 in the horizontal direction, unlike in the first embodiment. A motor 50 is accommodated in one space separated by the support plate 200. A rotation mechanism including rod-shaped first and second magnets 210, 220 is accommodated in the other space.

The motor 50 is operated by an electric power from a battery (not shown) and its drive shaft 52 is connected to a gear 230 through the support plate 200. Two gears 232, 234 are meshed with the gear 230. The first magnet 210 has a cylindrical shape and has an S pole and an N pole extending along the axial direction as shown in FIG. 8A. One end of the first magnet 210 is rotatably attached to the support plate 200 by a shaft 212 and the other end is rotatably attached to the housing 20 by a shaft 214. Further, the gear 232 is attached to one end of the first magnet 210. The second magnet 220 also has the same configuration as the first magnet 210, one end of which is rotatably attached to the support plate 200 by a shaft 222, the other end of which is connected by a shaft 224 to the housing 20. The gear 234 is attached to one end of the second magnet 220. In such configurations, as the drive shaft of the motor 50 rotates, its rotation is transmitted to the first and second magnets 210, 220 via the gears 230, 232 and 234.

By driving the gears 232, 234 a5 both sides by the gear 230, it is possible to form a desired distance (r1+r2) between the first and second magnets 210, 220. In this example, since the gear 232 and the gear 234 have different diameters, r1 is not equal to r2, but r1=r2 is also possible. In case of r1=r2, the magnetic poles of the first and second magnets 210, 220 are preferably synchronized. Synchronization means that the angular position of the S pole of the first magnet 210 and the angular position of the S pole of the second magnet 220 are equal. Also, the first and second magnets 210, 220 are located at the depth of distance d from the open end 24 of the housing 20. Depending on the distance d and the space between the first and second magnets 210, 220, the horizontal component of the lines of magnetic force at the housing end portion can be adjusted.

In the second embodiment as well, since the first and second magnets 210, 220 are rotated, the direction of the lines of magnetic force between the first and second magnets 210, 220 is constantly changed. The erasable area by the magnetic erasing device of the second embodiment is a rectangular area defined by the space (r1+r2) between the first and second magnets 210, 220 and the axial length of the first and second magnets 210, 220. It should be noted that the magnet used in the second embodiment may be a rectangular parallelepiped magnet as shown in FIG. 8B.

In the second embodiment, the first and second magnets 210, 220 are rotated by the gears 232 and 234, but the second embodiment is not necessarily limited to such configurations. For example, only the first magnet 210 may be rotated by the power from the motor 50 and the second magnet 220 may be rotated by the magnetic force from the first magnet 210.

FIGS. 8C-8E show a modified example of the second embodiment. FIG. 8C shows a single cylindrical (sor of rod) permanent magnet 250 rotated by a motor. Also in this configuration, the lines of magnetic force change within the internal space of the housing 20 to erase the magnetic panel. FIG. 8D shows a plurality of permanent magnets 260, 262, 264 in parallel rotated by using a rotating mechanism such as a gear. Each permanent magnet 260, 262, 264 may be rotated synchronously or may be rotated asynchronously. When the poles are synchronized, the change in the magnetic field may be uniform, but if the magnetic poles are asynchronous, the magnetic field may be random. FIG. 8E shows a plurality of permanent magnets 270, 272, 274 connected in series and rotated. In this case, a constant space 280 may be formed between the magnets. As well, they may be rotated synchronously or asynchronously.

Figure 8F:
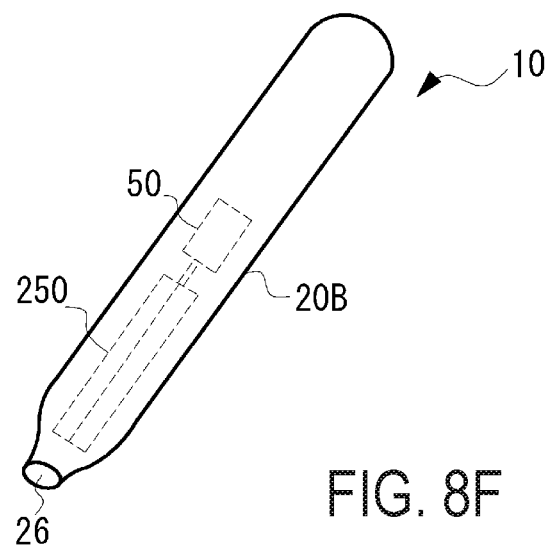
FIG. 8F shows an example when the magnetic erasing device is configured as a pen type according to the present embodiment

In case of rotating the rod-shaped magnet as shown in FIGS. 8C-8E by a motor, the shape of the housing may be a pen style as shown in FIG. 8F. The rod-shaped magnet 250 and so on are accommodated so as to extend along the axial direction of the pen style housing 20B. Such pen type magnetic erasing divide is suitable for erasing a fine region.

Figure 9:
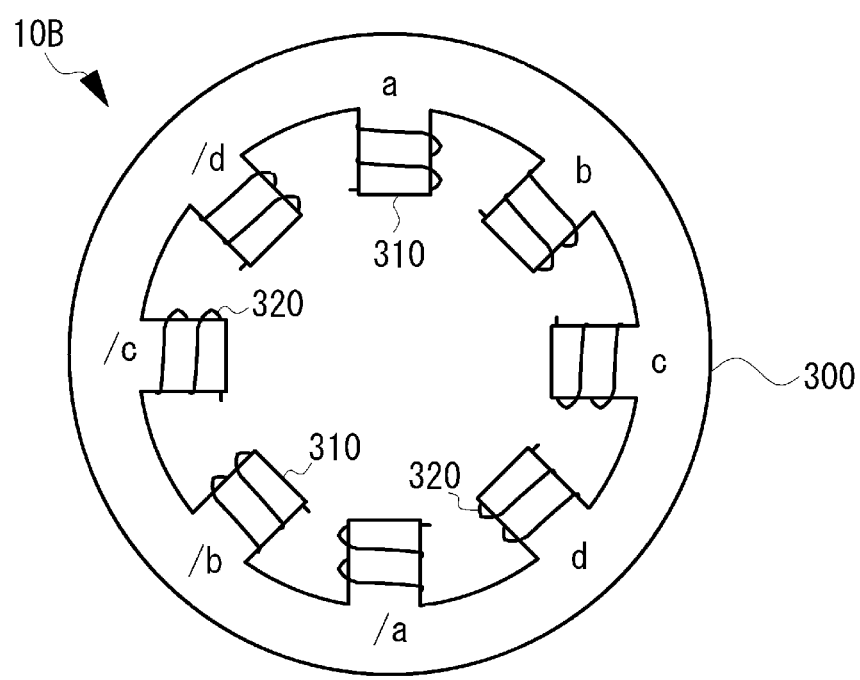
FIG. 9 shows a plane view for a main part of a magnetic erasing device according to a third embodiment of the present invention.

Next, a magnetic erasing device according to a third embodiment of the present invention will be described. The magnetic erasing device 10B according to the third embodiment generates and changes a magnetic field by an electromagnet. FIG. 9 shows a main part of the magnetic erasing device according to the third embodiment. The magnetic erasing device of the third embodiment includes an annular stator 300 made of a magnetic material such as iron in a housing. Eight protrusions 310 are integrally formed on the inner periphery of the stator 300 at intervals of 45 degrees. Coil 320 is wound around each of the eight protrusions 310. Here, for convenience, eight protrusions are referred to be a, b, c, d, /a, /b, /c, /d. The coils are wound around the protrusions a, b, c, d in the same direction respectively, and the coils are wound around the protrusions /a, /b, /c, /d in opposite directions with respect of the protrusions a, b, c, d.

Figure 10A:
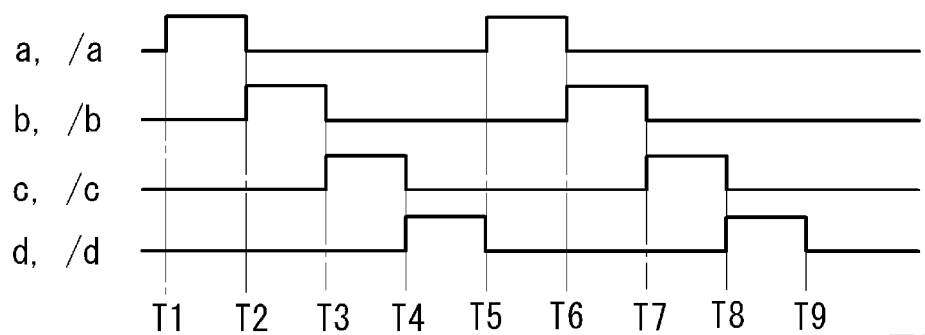
FIGS. 10A and 10B, is a timing chart of currents applied to the third embodiment.
Figure 10B:
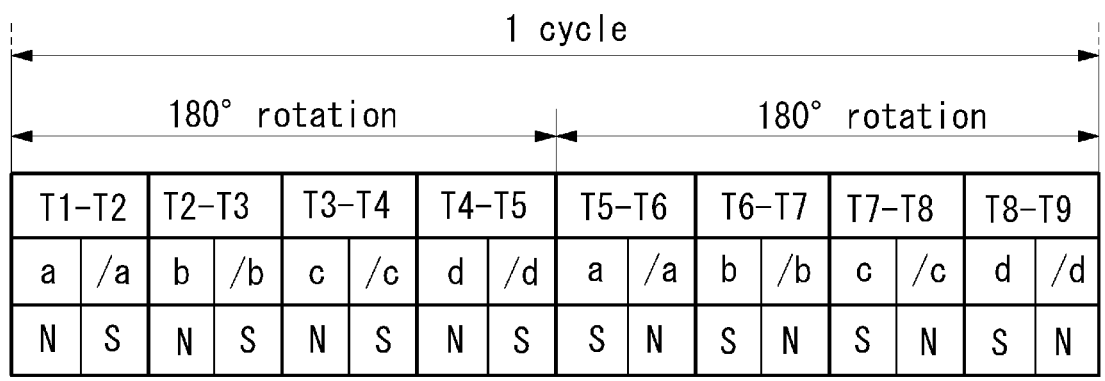
Figure 11:
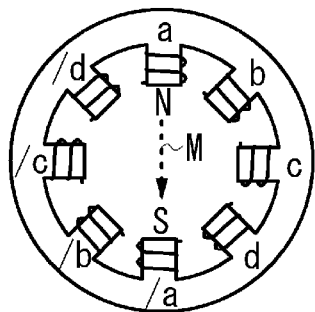
FIG. 11 shows changes in lines of magnetic force in the stator during time periods T1 to T9.
Figure 11:
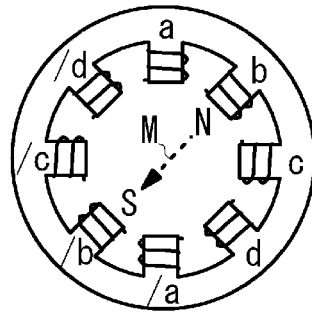
Figure 11:
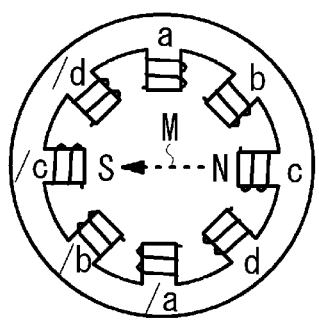
Figure 11:
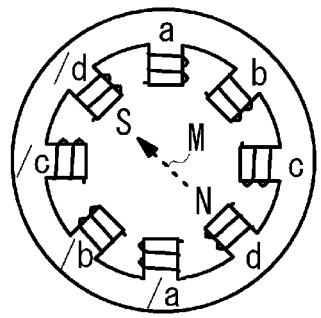
Figure 11:
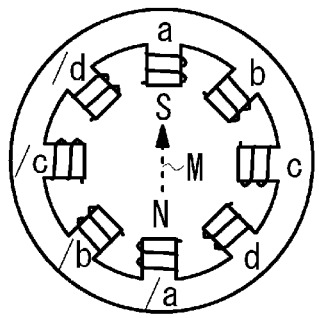
Figure 11:
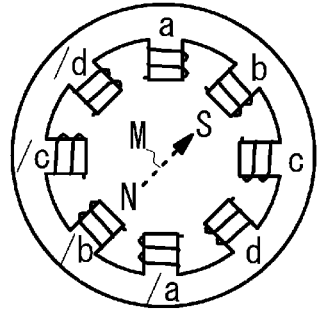
Figure 11:
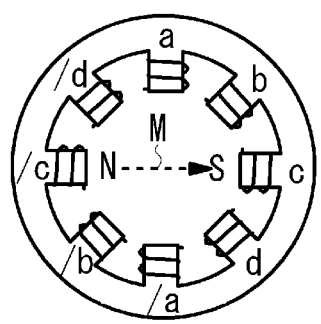
Figure 11:
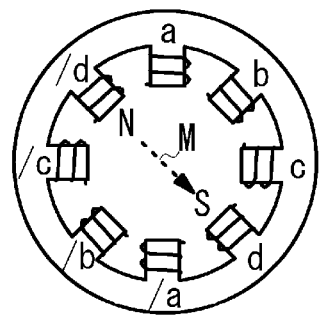

The magnetic erasing device further includes a driving circuit (not shown) for applying a current to the coils. The driving circuit temporally changes the magnetic field generated in the stator 300 by applying a current, whose phase is shifted by 45 degrees, to the coils as shown in FIG. 10A. First, in the time period T1-T2, the current pulse is applied to each coil of the protrusion "a" and the opposite protrusion "/a". At this time, an N pole is generated at the tip of the protrusion "a", and an S pole is generated at the protrusion "/a". Next, in the time period T 2-T 3, the current pulse is applied to each coil of the protrusion "b" and the opposite protrusion "/b". At this time, an N pole is generated at the tip of the protrusion "b", and an S pole is generated at the protrusion "/b". Thereafter, similarly, in the time period T3-T4, an N pole is generated in the protrusion "c", an S pole is generated in the protrusion "/c". In the time period T4-T5, an N pole is generated in the protrusion "d" and an S pole is generated in the protrusion "/d". In the next time period T 5-T 6, an N pole is generated at the protrusion "/a", and an S pole is generated at the protrusion "a". Thereafter, N poles are generated sequentially at the protrusions "/b", "/c" and "/d", and S poles are generated at the protrusions "b", "c", and "d". FIGS. 10A-10B shows an example in which N poles and S poles make clockwise transition in the time periods T1 to T9. In this way, the lines of magnetic force varied by 45 degrees are generated.

In the above example, the directions of the coils are inverted in order to generate different magnetic poles on a pair of opposing protrusions. However, the present invention is not limited to it, and the coils wound around all the protrusions may be oriented in the same direction, then a, b, c, d and /a, /b, /c, /d may be reversed.

Figure 12A:
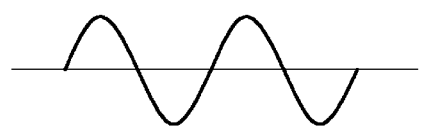
FIGS. 12A-12C, shows an example of a voltage (current) waveform applied to a coil.
Figure 12B:
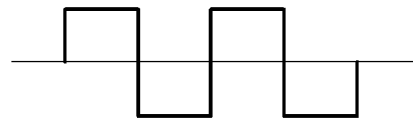
Figure 12C:
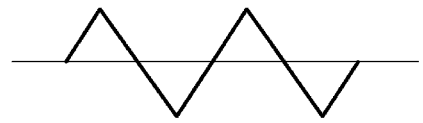

In the above example, the current pulse is applied to the coil, however, the present invention is not limited to this wave. For example, the current pulse may be a sinusoidal wave as shown in FIG. 12A, a rectangular wave as shown in FIG. 12B, and a triangular wave as shown in FIG. 12C. If such positive and negative voltage waveform is applied, it is possible to generate N pole and S pole in the protrusions in one cycle of the waveform and the S pole and the N pole are generated at the opposite protrusions. In addition, the magnetic force can be adjusted by appropriately changing the magnitude of the current to flow and the number of turns of the coil.

The magnetic erasing device 10B shown in the third embodiment can erase characters or the like drawn on the magnetic panel 100 from the front side or from the back side as well as the magnetic erasing device shown in the first and second embodiments.

Figure 13A:
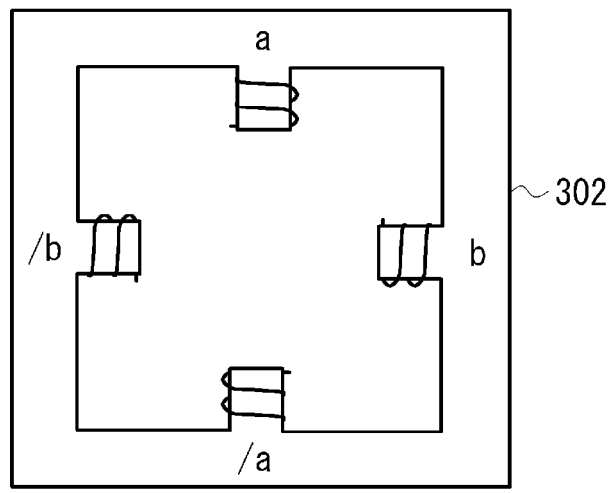
FIGS. 13A and 13B, shows a modified example of the magnetic erasing device according to the third embodiment of the present invention.
Figure 13B:
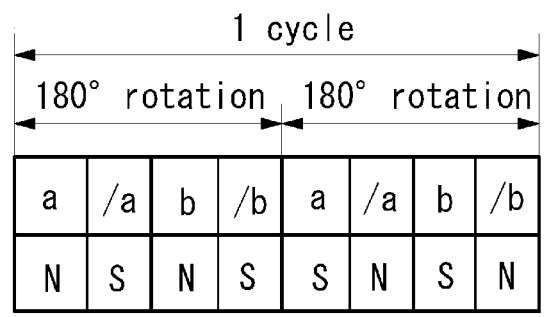

Next, a modified example of the third embodiment is shown in FIG. 13. The stator 302 shown in this figure has a rectangular shape. Four protrusions "a", "b", "/a", "/b" are formed at an interval of 90 degrees at the inner periphery of the stator 302, and each coil is wound around each protrusion. Also in this case, for example, when the current pulse, whose a phase is shifted by 90 degrees, is applied to the coils of the protrusions "a", "/a", an N pole is generated at the protrusion "a" and an S pole is generated at the protrusion "/a". When the current pulse is applied to the coils of the protrusions "b" and "/b", an N pole is generated at the protrusion "b" and an S pole is generated at the protrusion "/b". Thereafter, an N pole is generated at the protrusions "/a" and "/b", an S pole is generated at the protrusions "a" and "b". Note that the shape of the stator may be a polygon (for example, a hexagon) other than a rectangular shape.

Figure 14A:
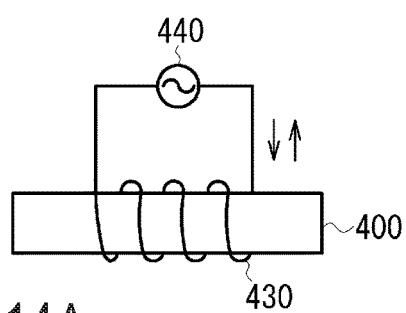
FIG. 14 which includes FIGS. 14A-14D, explains a main part of a magnetic erasing device according to a fourth embodiment of the present invention.
Figure 14B:
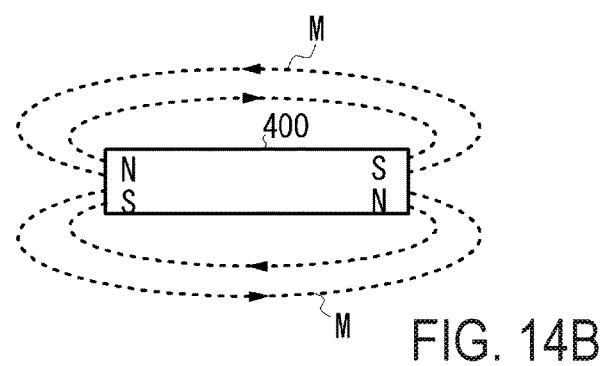

Next, a fourth embodiment of the present invention will be described. In the fourth embodiment, as shown in FIG. 14A, a rod-shaped or cylindrical iron core 400, a coil 430 wound around the iron core 400, and current applying means 440 for applying a current to the coil 430 are prepared. The current applying means 440 applies the current, which has positive and negative voltage cycles as shown in FIGS. 12A, 12B, and 12C, to the coil 430 to invert the direction of the current flowing through the coil 430. As the result, magnetic poles generated at both end portions of the iron core 400 change every half cycle. FIG. 14B schematically shows magnetic poles generated at both end portions of the iron core 400 and the lines of magnetic force M thereof. By appropriately selecting the axial length of the iron core 400, lines of magnetic force M generated from the both ends become substantially parallel to the axis. Therefore, the erasing efficiency could be enhanced and the color of the magnetic panel after the erasing could be clearer by the action of the horizontal components of the lines of magnetic force to the magnetic panel.

Figure 14C:
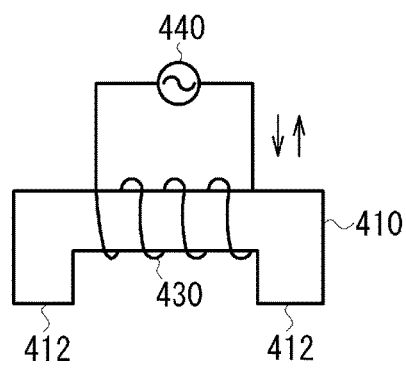
Figure 14D:
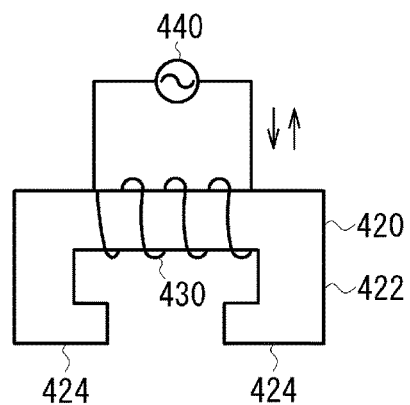

FIG. 14C is a modified example of the iron core. The iron core 410 shown in this figure has leg portions 412 each extending in the vertical direction from both end portions. With such legs 412, the lines of magnetic force are suppressed inside without beyond the legs 412. This makes it possible to clarify the boundary of the erasing area. FIG. 14D is a further modified example of an iron core, in which leg portions 422 are formed at both ends of the iron core 420 and in which extending portions 424 each extending in the horizontal direction are further formed at the leg portions 422. Therefore, the lines of magnetic force can be further confined in the leg portions 422 and the extending portions 424, and the erasing area becomes clearer.

The configuration of the electromagnet shown in the fourth embodiment can be replaced by the rod-shaped permanent magnets 210 and 220 of the magnetic erasing device 10A shown in the second embodiments.

Although the preferred embodiments of the present invention have been described in detail above, the present invention is not limited to the specific embodiments, but various other modifications may be made without departing from the spirit and scope of the present invention as set forth in the appended claims. Modification/change is possible.

What is claimed is:

1. A magnetic erasing device for a magnetophoretic type magnetic panel, the magnetophoretic type magnetic panel including a plurality of microcapsules arranged two-dimensionally, each microcapsule including magnetic particles and nonmagnetic particles, the magnetic erasing device comprising:
   a shaft rotatable about an axis;
   a magnet comprising an S pole and an N pole, the magnet coupled to the shaft and extending along the axis; and
   a rotation mechanism coupled to the shaft so that the magnet is rotatable in a housing around the axis, wherein, during operation of the magnetic erasing device, lines of magnetic force generated during rotation of the magnet are applied to the magnetic particles in the microcapsules to erase a visible image on the magnetic panel when the magnet is substantially parallel with and spaced from a surface of the magnetic panel by a predetermined distance.

2. The magnetic erasing device according to claim 1, wherein the magnetic erasing device comprises a plurality of magnets connected in series, the magnet being one of the plurality of magnets.

3. The magnetic erasing device according to claim 1, wherein the magnetic erasing device comprises a plurality of magnets and each magnet is connected in parallel, the magnet being one of the plurality of magnets.

4. The magnetic erasing device according to claim 1, wherein the magnet has a cylindrical shape.

5. The magnetic erasing device according to claim 1, wherein the magnet has a rectangular parallelepiped shape.

6. The magnetic erasing device according to claim 1, wherein the rotation mechanism comprises a motor comprising a drive shaft and a gear coupled between the shaft and the drive shaft.

7. The magnetic erasing device according to claim 2, wherein the plurality of magnets are synchronously rotatable.

8. The magnetic erasing device according to claim 2, wherein the plurality of magnets are asynchronously rotatable.

9. The magnetic erasing device according to claim 3, wherein the plurality of magnets are synchronously rotatable.

10. The magnetic erasing device according to claim 3, wherein the plurality of magnets are asynchronously rotatable.

11. A magnetic panel system comprising:
a magnetophoretic type magnetic panel including a plurality of microcapsules arranged two-dimensionally, each microcapsule including magnetic particles and nonmagnetic particles; and
a magnetic erasing device for use in erasing a visible image on the magnetic panel, the magnetic erasing device comprising:
a shaft rotatable about an axis;
a magnet comprising an S pole and an N pole, the magnet coupled to the shaft and extending along the axis; and
a rotation mechanism coupled to the shaft so that the magnet is rotatable in a housing around the axis,
wherein, during operation, lines of magnetic force generated during rotation of the magnet are applied to the magnetic particles in the microcapsules to erase the visible image on the magnetic panel when the magnet is substantially parallel with and spaced from a surface of the magnetic panel by a predetermined distance.

12. The magnetic panel system according to claim 11, wherein the magnetic erasing device comprises a plurality of magnets connected in series, the magnet being one of the plurality of magnets.

13. The magnetic panel system according to claim 11, wherein the magnetic erasing device comprises a plurality of magnets and connected in parallel, the magnet being one of the plurality of magnets.

14. The magnetic panel system according to claim 11, wherein the magnet has a cylindrical shape.

15. The magnetic panel system according to claim 11, wherein the magnet has a rectangular parallelepiped shape.

16. The magnetic panel system according to claim 11, wherein the rotation mechanism comprises a motor comprising a drive shaft and a gear coupled between the shaft and the drive shaft.

17. The magnetic panel system according to claim 12, wherein the plurality of magnets are synchronously rotatable.

18. The magnetic panel system according to claim 12, wherein the plurality of magnets are asynchronously rotatable.

19. A magnetic erasing device comprising:
a housing;
a support plate separating the housing into first and second internal spaces;
a motor disposed in the first internal space of the housing;
a plurality of magnets disposed in the second internal space of the housing, each magnet comprising an S pole and an N pole;
a gear mechanism located between the motor and the magnets;
a drive shaft coupled between the motor and the gear mechanism, wherein, during operation of the magnetic erasing device, the motor causes the drive shaft to rotate so the magnetics rotate around an axis extending between the support plate and an upper end of the housing.

20. A system comprising:
a magnetophoretic type magnetic panel comprising a plurality of microcapsules arranged two-dimensionally, each microcapsule including magnetic particles and nonmagnetic particles; and
the magnetic erasing device of claim 19 for erasing a visible image on the magnetic panel when the magnets are rotating and spaced from a surface of the magnetic panel by a predetermined distance.

* * * * *